US012711645B2

(12) United States Patent
Chen et al.

(10) Patent No.: US 12,711,645 B2
(45) Date of Patent: Aug. 18, 2026

(54) WAVEFRONT SENSOR-BASED SYSTEMS FOR CHARACTERIZING OPTICAL ZONE DIAMETER OF AN OPHTHALMIC DEVICE AND RELATED METHODS

(71) Applicant: Johnson & Johnson Vision Care, Inc., Jacksonville, FL (US)

(72) Inventors: Minghan Chen, Jacksonville, FL (US); Phillipe Jubin, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 624 days.

(21) Appl. No.: 17/203,414

(22) Filed: Mar. 16, 2021

(65) Prior Publication Data

US 2022/0301213 A1 Sep. 22, 2022

(51) Int. Cl.
*G06T 7/62* (2017.01)
*G02C 7/04* (2006.01)

(52) U.S. Cl.
CPC .................. *G06T 7/62* (2017.01); *G02C 7/04* (2013.01); *G06T 2207/20101* (2013.01)

(58) Field of Classification Search
CPC ............ G02C 7/04; G06T 2207/20101; G06T 2207/30041; G06T 7/00; G06T 7/62
See application file for complete search history.

(56) References Cited

U.S. PATENT DOCUMENTS

| | | | |
|---|---|---|---|
| 4,436,887 | A | 3/1984 | Chromecek et al. |
| 4,495,313 | A | 1/1985 | Larsen |
| 4,659,782 | A | 4/1987 | Spinelli |
| 4,659,783 | A | 4/1987 | Spinelli |
| 4,889,664 | A | 12/1989 | Kindt-larsen et al. |
| 5,006,622 | A | 4/1991 | Kunzler et al. |
| 5,039,459 | A | 8/1991 | Kindt-larsen et al. |
| 5,236,969 | A | 8/1993 | Kunzler et al. |
| 5,244,981 | A | 9/1993 | Seidner et al. |
| 5,270,418 | A | 12/1993 | Kunzler et al. |
| 5,298,533 | A | 3/1994 | Nandu et al. |
| 5,314,960 | A | 5/1994 | Spinelli et al. |

(Continued)

FOREIGN PATENT DOCUMENTS

| | | | | |
|---|---|---|---|---|
| JP | 2015017973 | * | 1/2015 | ............ G01M 11/02 |
| WO | 03022321 A2 | | 3/2003 | |
| WO | 2008061992 A2 | | 5/2008 | |

OTHER PUBLICATIONS

"Compendium of Polymer Terminology and Nomenclature: IUPAC Recommendations", edited by: Richard G. Jones, Jaroslav Kahovec, Robert Stepto, Edward S. Wilks, Michael Hess, Tatsuki Kitayama, and W. Val Metanomski, 8 pages, 2008.

*Primary Examiner* — Zhiyu Lu

(57) ABSTRACT

Systems and methods for characterizing optical zone diameter of ophthalmic devices are described herein. An example system includes a light source, a Shack-Hartmann wavefront sensor, and a computing device operably coupled to the wavefront sensor. The computing device includes a processor and a memory operably coupled to the processor. The computing device is configured to receive an image of an ophthalmic device, where the image is captured by the wavefront sensor. The computing device is also configured to analyze the image to detect an optical zone (OZ) boundary of the ophthalmic device and measure a diameter of the OZ boundary of the ophthalmic device.

33 Claims, 10 Drawing Sheets

(56) References Cited

U.S. PATENT DOCUMENTS 5,331,067 A 7/1994 Seidner et al.
5,371,147 A 12/1994 Spinelli et al.
5,760,100 A 6/1998 Nicolson et al.
5,776,999 A 7/1998 Nicolson et al.
5,789,461 A 8/1998 Nicolson et al.
5,824,719 A 10/1998 Kunzler et al.
5,849,811 A 12/1998 Nicolson et al.
5,965,631 A 10/1999 Nicolson et al.
5,998,498 A 12/1999 Vanderlaan et al.
6,087,415 A 7/2000 Vanderlaan et al.
6,367,929 B1 4/2002 Maiden et al.
6,420,453 B1 7/2002 Bowers et al.
6,423,761 B1 7/2002 Bowers et al.
6,767,979 B1 7/2004 Muir et al.
6,822,016 B2 11/2004 McCabe et al.
6,867,245 B2 3/2005 Iwata et al.
6,943,203 B2 9/2005 Vanderlaan et al.
7,247,692 B2 7/2007 Laredo
7,249,848 B2 7/2007 Laredo et al.
7,553,880 B2 6/2009 Nicolson et al.
7,666,921 B2 2/2010 McCabe et al.
7,786,185 B2 8/2010 Rathore et al.
7,934,830 B2 5/2011 Blackwell et al.
7,956,131 B2 6/2011 Arnold et al.
8,022,158 B2 9/2011 Rathore et al.
8,138,290 B2 3/2012 Blackwell et al.
8,273,802 B2 9/2012 Laredo et al.
8,389,597 B2 3/2013 Blackwell et al.
8,399,538 B2 3/2013 Steffen et al.
8,450,387 B2 5/2013 McCabe et al.
8,470,906 B2 6/2013 Rathore et al.
8,487,058 B2 7/2013 Liu et al.
8,507,577 B2 8/2013 Zanini et al.
8,637,621 B2 1/2014 Iwata et al.
8,703,891 B2 4/2014 Broad
8,937,110 B2 1/2015 Alli et al.
8,937,111 B2 1/2015 Alli et al.
8,940,812 B2 1/2015 Reboul et al.
9,056,878 B2 6/2015 Fujisawa et al.
9,057,821 B2 6/2015 Broad et al.
9,125,808 B2 9/2015 Alli et al.
9,140,825 B2 9/2015 Alli et al.
9,156,934 B2 10/2015 Alli et al.
9,170,349 B2 10/2015 Mahadevan et al.
9,244,196 B2 1/2016 Scales et al.
9,244,197 B2 1/2016 Alli et al.
9,260,544 B2 2/2016 Rathore et al.
9,297,928 B2 3/2016 Molock et al.
9,297,929 B2 3/2016 Scales et al.
2004/0156013 A1* 8/2004 Lindacher ............. A61F 2/1613 351/159.41
2010/0048847 A1 2/2010 Broad
2012/0314187 A1* 12/2012 Farrer .................. A61B 3/1015 351/221
2013/0050637 A1* 2/2013 Roffman ................ G02C 7/043 351/159.2
2013/0201444 A1* 8/2013 Back ...................... G02C 7/044 351/159.73
2014/0092395 A1* 4/2014 Fechner ............. G01M 11/0235 356/124
2014/0268045 A1* 9/2014 Bor .......................... A61B 3/14 351/206
2015/0100049 A1* 4/2015 Mordaunt ........... A61F 9/00821 606/5
2015/0134316 A1* 5/2015 Dai ..................... A61F 9/00804 703/11
2016/0095515 A1* 4/2016 Bor .......................... A61B 3/14 351/246
2018/0243082 A1* 8/2018 Zheleznyak ........ A61F 9/00829
2021/0177579 A1* 6/2021 Zheleznyak ........ A61F 9/00806
2022/0334026 A1* 10/2022 Lamprecht ......... G01M 11/0257

* cited by examiner

WAVEFRONT SENSOR-BASED SYSTEMS FOR CHARACTERIZING OPTICAL ZONE DIAMETER OF AN OPHTHALMIC DEVICE AND RELATED METHODS

BACKGROUND OF THE INVENTION

1. Field of the Invention

The present invention relates to systems and methods for characterizing the optical zone diameter of ophthalmic devices, and more particularly, to systems and methods including a wavefront sensor.

2. Discussion of the Related Art

Soft contact lens optical zone (OZ) diameter is an important soft contact lens parameters that affect its optical performance. Depending on lens types and prescriptions, typically a 7-to-9-millimeter (mm) OZ is employed. Within the OZ of the lens, desired optical power is applied on the lens surface to correct a patient's ocular refraction error. Beyond the OZ, it is the peripheral zone that is utilized to optimize lens on eye mechanical properties such as lens static and dynamic movement, lens comfort, etc. Between the OZ, which is located in a central part of the lens, and the peripheral zone, a boundary area is specifically designed and fabricated during the manufacturing process. Accurately measuring the location of the boundary area significantly helps to characterize the lens's optical properties, manufacturing quality, and overall visual correction performance.

Currently, interferometry is widely used for lens power characterization and OZ diameter measurement. Interferometry uses waves (e.g., light) to create interference patterns, which can be captured in an image and then used to measure the OZ diameter of the lens. For example, an interferometer can be used to conduct wavefront reconstruction utilizing the measured interference pattern. OZ diameter measurements using interferometer-based systems, however, may be inaccurate. This is particularly the case for low-power soft contact lenses.

SUMMARY OF THE INVENTION

The wavefront sensor-based systems and methods for characterizing optical zone diameter of ophthalmic devices of the present invention overcomes the disadvantages associated with the prior art as briefly set forth above.

An example system for characterizing optical zone diameter of ophthalmic lenses is described herein. The system includes a light source, a Shack-Hartmann wavefront sensor, and a computing device operably coupled to the Shack-Hartmann wavefront sensor. The computing device includes a processor and a memory operably coupled to the processor. The computing device is configured to receive an image of an ophthalmic device, where the image is captured by the Shack-Hartmann wavefront sensor. The computing device is also configured to analyze the image to detect an optical zone (OZ) boundary of the ophthalmic device and measure a diameter of the OZ boundary of the ophthalmic device.

Alternatively or additionally, the Shack-Hartmann wavefront sensor includes an array of lenslets and a photon sensor. The photon sensor is a charged-coupled device (CCD) array or a complimentary metal-oxide-semiconductor (CMOS) array.

Alternatively or additionally, the light source is a collimated light source or a point source.

Alternatively or additionally, the image includes a spot pattern, where the spot pattern includes a plurality of spots and a plurality of distorted spots. In some implementations, respective focal points of the distorted spots are shifted in at least one direction. In some implementations, the distorted spots include at least two overlapping spots in the spot pattern. In some implementations, the distorted spots include a spot in the spot pattern that is split into two or more portions.

Alternatively or additionally, the step of analyzing the image to detect an optical zone (OZ) boundary of the ophthalmic device includes selecting two or more of the distorted spots in the spot pattern, and fitting a curve to the selected distorted spots, where the curve is the OZ boundary of the ophthalmic device. For example, the step of selecting two or more of the distorted spots in the spot pattern can include selecting between about 3 and about 50 distorted spots. In some implementations, the selected distorted spots are distributed around the curve. Optionally, the selected distorted spots are distributed with even or uneven spacing around the curve.

In some implementations, the step of selecting two or more of the distorted spots in the spot pattern includes receiving user-selected distorted spots.

In other implementations, selecting two or more of the distorted spots in the spot pattern includes selecting the two or more of the distorted spots using an image processing algorithm.

In some implementations, the ophthalmic device is a contact lens. Optionally, a power of the contact lens is between about −12 diopters (D) and about +9 D. Optionally, the contact lens is a low-power contact lens.

An example method system for characterizing optical zone diameter of ophthalmic lenses is described herein. The method includes receiving, at a computing device, an image of an ophthalmic device captured by a Shack-Hartmann wavefront sensor; analyzing, using the computing device, the image to detect an optical zone (OZ) boundary of the ophthalmic device; and measuring, using the computing device, a diameter of the OZ boundary of the ophthalmic device.

Alternatively or additionally, the method further includes capturing the image of the ophthalmic device using the Shack-Hartmann wavefront sensor.

In some implementations, the ophthalmic device is a contact lens. Optionally, a power of the contact lens is between about −12 diopters (D) and about +9 D. Optionally, the contact lens is a low-power contact lens. Optionally, the method further includes immersing the contact lens in a solution before capturing the image.

Alternatively or additionally, the image includes a spot pattern, where the spot pattern includes a plurality of spots and a plurality of distorted spots. In some implementations, respective focal points of the distorted spots are shifted in at least one direction. In some implementations, the distorted spots include at least two overlapping spots in the spot pattern. In some implementations, the distorted spots include a spot in the spot pattern that is split into two or more portions.

Alternatively or additionally, the step of analyzing the image to detect an optical zone (OZ) boundary of the ophthalmic device includes selecting two or more of the distorted spots in the spot pattern, and fitting a curve to the selected distorted spots, where the curve is the OZ boundary of the ophthalmic device. For example, the step of selecting two or more of the distorted spots in the spot pattern can include selecting between about 3 and about 50 distorted spots. In some implementations, the selected distorted spots are distributed around the curve. Optionally, the selected distorted spots are distributed with even or uneven spacing around the curve.

In some implementations, the step of selecting two or more of the distorted spots in the spot pattern includes receiving user-selected distorted spots.

In other implementations, selecting two or more of the distorted spots in the spot pattern includes selecting the two or more of the distorted spots using an image processing algorithm.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 4A shows the difference in interference patterns between the central region (e.g., optical zone) and peripheral region of the lens. FIG. 4B includes a circle that represents the boundary area between the lens' optical zone and peripheral region.

In FIG. 8A, the lens' diameter is greater than the sensor size. In FIG. 8B, the lens is intentionally decentered in order to capture the OZ boundary more clearly with the sensor.

DETAILED DESCRIPTION OF THE PREFERRED EMBODIMENTS

Glossary

Figure 1:
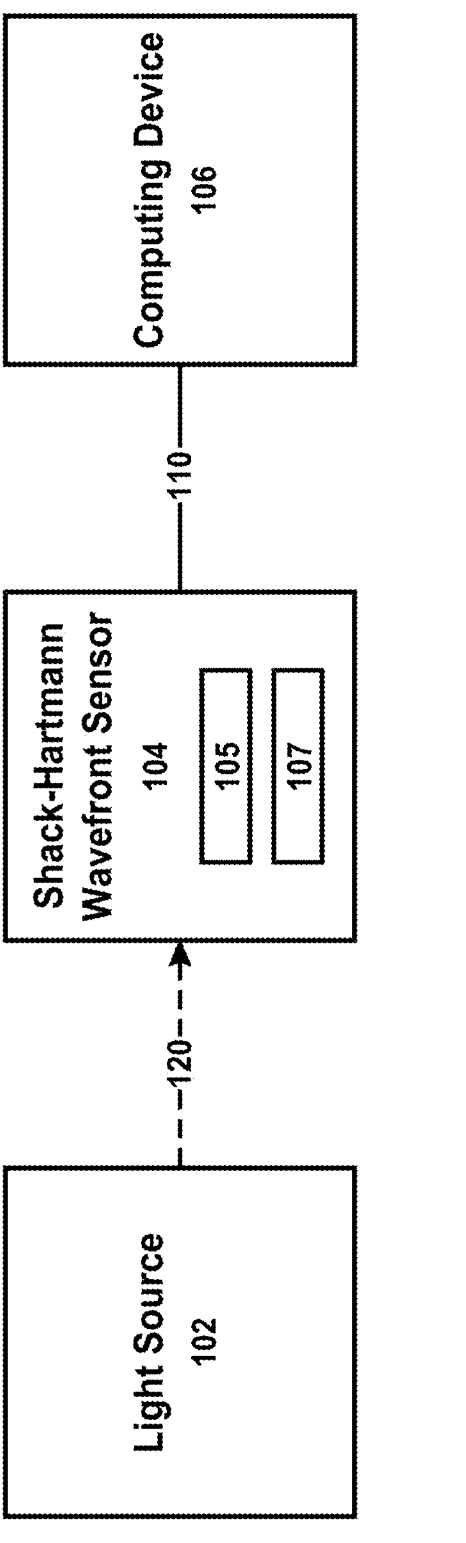
FIG. 1 is a block diagram of an example system, including a wavefront sensor, for characterizing optical zone diameter of ophthalmic devices in accordance with the present invention.

With respect to the terms used in this disclosure, the following definitions are provided. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski.

As used herein, the term "about" refers to a range of +/−5% of the number that is being modified. For example, the phrase "about 10" would include both 9.5 and 10.5.

A "biomedical device" is any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, sutures and ophthalmic devices such as intraocular lenses and contact lenses. The biomedical devices may be ophthalmic devices, such as contact lenses, including contact lenses made from silicone hydrogels.

"Individual" includes humans and vertebrates.

"Ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

"Ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutriceutical components, or a combination of any of the foregoing. Examples of ophthalmic devices include, but are not limited to, lenses and optical and ocular inserts, including, but not limited to punctal plugs and the like. "Lens" includes soft contact lenses, hard contact lenses, hybrid contact lenses, intraocular lenses, and overlay lenses. The ophthalmic device may comprise a contact lens.

"Optical zone" refers to an area of an ophthalmic lens that is designed to produce refractive correction or other optical or therapeutic effect.

"Contact lens" refers to a structure, an ophthalmic device that can be placed on the cornea of an individual's eye. The contact lens may provide corrective, cosmetic, therapeutic benefit, including wound healing, delivery of drugs or neutraceuticals, diagnostic evaluation or monitoring, or UV blocking and visible light or glare reduction, or a combination thereof. A contact lens can be of any appropriate material known in the art, and can be a soft lens, a hard lens, or a hybrid lens containing at least two distinct portions with different properties, such as modulus, water content, light absorbing characteristics or combinations thereof.

The biomedical devices, ophthalmic devices, and lenses of the present invention may be comprised of silicone hydrogels. These silicone hydrogels typically contain a silicone component and/or hydrophobic and hydrophilic monomers that are covalently bound to one another in the cured device.

"Silicone hydrogel contact lens" refers to a contact lens comprising at least one silicone hydrogel material. Silicone hydrogel contact lenses generally have increased oxygen permeability compared to conventional hydrogels. Silicone hydrogel contact lenses use both their water and polymer content to transmit oxygen to the eye.

A "polymeric network" is cross-linked macromolecule that can swell but cannot dissolve in solvents, because the polymeric network is essentially one macromolecule. "Hydrogel" or "hydrogel material" refers to a polymeric network that contains water in an equilibrium state. Hydrogels generally contain at least about 10 wt. % water.

"Conventional hydrogels" refer to polymeric networks made from monomers without any siloxy, siloxane or carbosiloxane groups. Conventional hydrogels are prepared from monomeric mixtures predominantly containing hydrophilic monomers, such as 2-hydroxyethyl methacrylate ("HEMA"), N-vinyl pyrrolidone ("NVP"), N, N-dimethylacrylamide ("DMA"), or vinyl acetate. U.S. Pat. Nos. 4,436,887, 4,495,313, 4,889,664, 5,006,622, 5,039,459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available hydrogel formulations include, but are not limited to, etafilcon, polymacon, vifilcon, genfilcon, lenefilcon, hilafilcon, nesofilcon, and omafilcon, including all of their variants.

"Silicone hydrogel" refers to a hydrogel obtained by copolymerization of at least one silicone-containing component with at least one hydrophilic component. Hydrophilic components may also include non-reactive polymers. Each of the silicone-containing components and the hydrophilic components may be a monomer, macromer or combination thereof. A silicone-containing component contains at least one siloxane or carbosiloxane group. Examples of commercially available silicone hydrogels include balafilcon, acquafilcon, lotrafilcon, comfilcon, delefilcon, enfilcon, fanfilcon, formofilcon, galyfilcon, senofilcon, narafilcon, falcon II, asmofilcon A, samfilcon, riofilcon, stenfilcon, somofilcon, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/048847. These patents, as well as all other patents disclosed in this paragraph, are hereby incorporated by reference in their entireties.

Overview

Systems and methods for characterizing optical zone diameter of ophthalmic devices are described herein. The systems and methods include a Shack-Hartmann ("SH") wavefront sensor. Using wavefront sensor-based systems and methods as described herein, it is possible to accurately measure OZ diameter of ophthalmic devices such as contact lenses.

The SH wavefront sensor-based systems and methods described herein have advantages as compared to other systems and method such as interferometer-based systems and methods. Such advantages include, but are not limited to, the ability to obtain measurements using a single light beam. An interferometer, on the other hand, needs a plurality of light beams (i.e., dual beam) in order to obtain the interferogram, which can be used to obtain the OZ diameter measurements. Additionally, a SH-wavefront sensor is more robust to environmental noise than an interferometer. Moreover, a SH-wavefront sensor is less expensive than an interferometer.

As described herein, conventional system and methods that employ interferometers have limitations, which include the inability to accurately measure OZ diameter of certain devices.

Example Embodiments

Referring now to FIG. 1, a block diagram of an example system for characterizing optical zone diameter of ophthalmic devices is shown. The system includes a light source 102, a wavefront sensor 104, and a computing device 106. The computing device 106 is operably coupled to the wavefront sensor 104. The wavefront sensor 104 and computing device 106 discussed above can be coupled through one or more communication links 110. This disclosure contemplates that the communication links 110 are any suitable communication link. For example, a communication link may be implemented by any medium that facilitates data exchange including, but not limited to, wired, wireless and optical links.

The light source 102 is configured to emit a light beam 120. As shown by the dashed line in FIG. 1, the light beam 120 illuminates the wavefront sensor 104. It should be understood that only a single light beam is used to obtain measurements for characterizing the optical zone with a Shack-Hartmann wavefront sensor-based systems. This approach is unlike interferometry, which uses wave interference and therefore requires a plurality of light beams to generate the interferogram. The light source 102 can be configured to emit at a wavelength in a range between about 350 nanometers (nm) and about 1000 nm. It should be understood that the 350-1000 nm range for emission wavelength is provided only as an example and that other emission wavelengths may be used with the systems and methods described herein. In some implementations, the light source 102 is a collimated light source. In other implementations, the light source 102 is a point source. Point sources include, but are not limited to, lasers, laser diodes, light-emitting diodes (LEDs).

The wavefront sensor 104 includes an array of lenslets 105 and a photon sensor 107. For example, the wavefront sensor 104 can be a Shack-Hartmann wavefront sensor. A Shack-Hartmann wavefront sensor is an optical instrument that is known in the art. A Shack-Hartmann wavefront sensor include an array of lenses (e.g., array of lenslets 105), where each lens (or lenslet) is focused on a photon sensor (e.g., photon sensor 107) such as a charged-coupled device (CCD) array or a complimentary metal-oxide-semiconductor (CMOS) array. The photon sensor 107 can be configured to operate in a wavelength range that corresponds to the emission wavelength of the light source 102, for example, in a range between about 350 nm and 1000 nm. It should be understood that the 350-1000 nm range for photon sensor sensitivity is provided only as an example and that other wavelength sensitivity ranges may be used with the systems and methods described herein. It should also be understood that CCD and CMOS arrays are provided only as example photon sensors and that other types of photon sensors may be used with the systems and methods described herein.

An ophthalmic device is imaged by placing the ophthalmic device between the light source 102 and the wavefront sensor 104 such that the light source 102 illuminates the ophthalmic device with the light beam 120. Optionally, the ophthalmic device is immersed in a liquid such as lens solution during the imaging process. As described herein, the ophthalmic device can be a lens or an optical and ocular insert. In some implementations, the ophthalmic device is a contact lens. The contact lens may have a power between about −12 D and about +9 D. There is a boundary region between the optical zone (OZ), which is located in the central region of a contact lens, and the peripheral zone, which is located on the periphery of the contact lens. The OZ is used to correct a patient's ocular refraction error, and the peripheral zone is used to optimize mechanical properties of the lens such as stabilizing the lens in the patient's eye. The boundary region is specifically designed and fabricated during the manufacturing process. There are variations in the thickness (or sag) profiles in the boundary region of the contact lens. These variations in the thickness (or sag) profiles of the contact lens in the boundary region cause wavefront distortion (described below). Additionally, contact lenses with relative high powers exhibit sharp variations in the thickness (or sag) profiles in the boundary region, while contact lenses with relatively lower powers do not exhibit such sharp variations. Optionally, the contact lens characterized by the systems and methods described herein is a low-power contact lens, for example, a contact lens having a power between about −4 diopters (D) and about 0 D. As described herein, less pronounced variations in thickness (or sag) profiles in low-power contact lenses make optical zone diameter measurements using interferometry less accurate (or even impossible to measure). This is particularly the case for a contact lens having a power of between about −4 D and +1 D, for example, a contact lens having a power of about −3 D. The systems and methods described herein offer improvements over interferometry based systems and can even be used to accurately measure OZ diameter of low-power contact lenses (see FIGS. 7-10). It should be understood that the systems and methods described herein can be used to characterize optical zone diameter of contact lenses having a power outside of the −4 D to 0 D range described above. It should also be understood that contact lenses are provided only as an example ophthalmic device. This disclosure contemplates that the systems and methods described herein can be used to characterize optical zone diameter of other types of ophthalmic devices including, but not limited to, optical and ocular inserts or other devices which reside in or on the eye or any part of the eye.

As the light beam 120 passes through the ophthalmic device, a distorted wavefront is generated, and the distorted waveform is captured by the wavefront sensor 104. In particular, the distorted wavefront is focused by the array of lenslets 105 into an array of focal points (also referred to herein as "spots"), and its image is captured by the photon sensor 107. As compared to a plane wave, the focal point position of the distorted wavefront is shifted (along the x-direction and/or y-direction), and the shifting distance can be measured with the photon sensor 107. For example, by using the shifting distance divided by lenslet focal length, the wavefront sensor 104 calculates the local wavefront slope at each individual lenslet location and obtains the overall wavefront map by wavefront reconstruction. Wavefront distortion is generated at the optical zone (OZ) boundary of the ophthalmic device, and the one or more focal points that are significantly shifted along x- and/or y-direction result in a visually clear OZ boundary in the image (see FIGS. 7-10). As described herein, the visible distortion in the OZ boundary is used to characterize the optical zone. The image captured by the wavefront sensor 104 can then be transmitted to the computing device 106, for example over the communication link 110, for further analysis by the computing device 106 as described below with regard to FIG. 2.

It should be understood that the system shown in FIG. 1 is provided only as an example. This disclosure contemplates that a system for characterizing optical zone diameter of ophthalmic devices may include additional components and/or have components arranged in a different manner. For example, this disclosure contemplates that the system may include an optical setup that includes, but is not limited to, lenses, mirrors, filters, cameras, and other optical components and devices.

Figure 2:
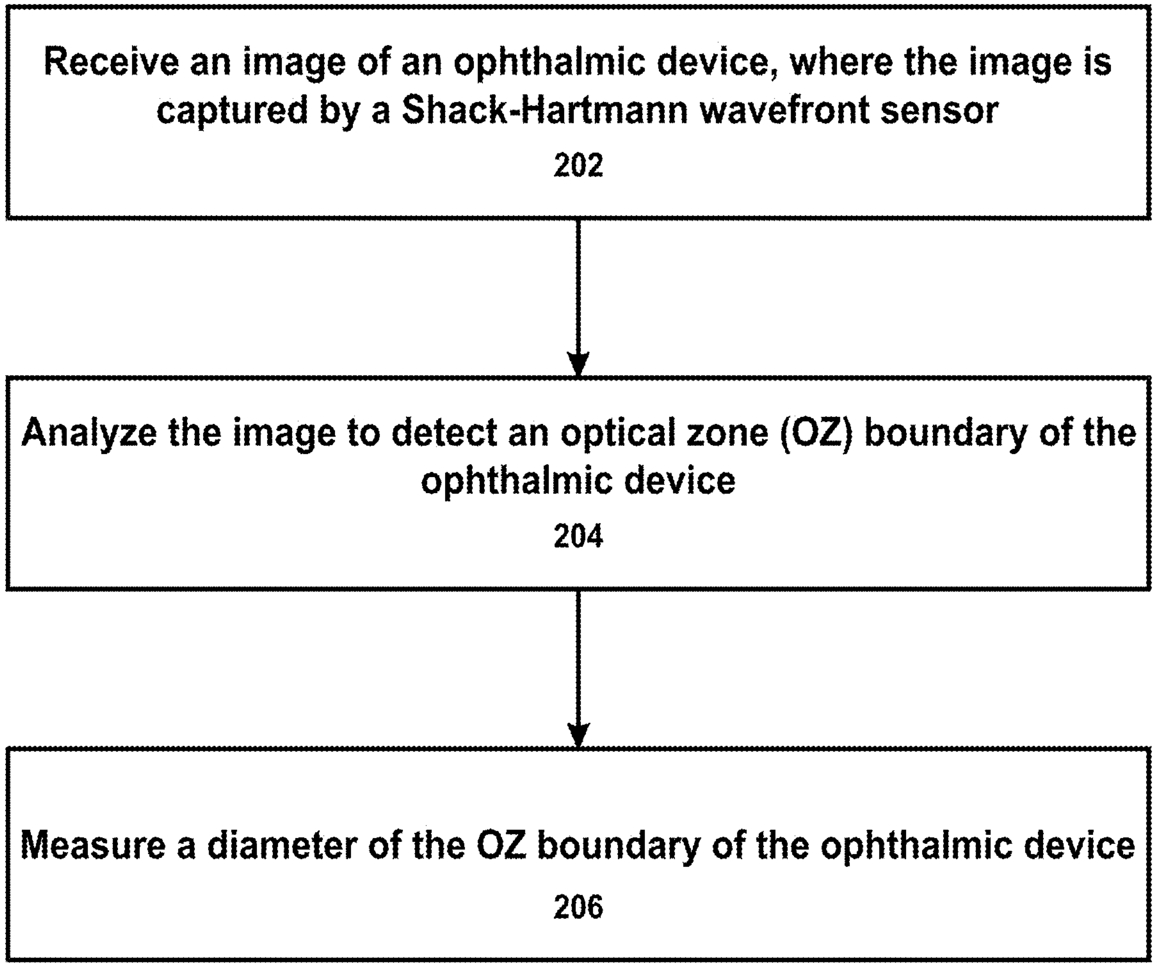
FIG. 2 is a flowchart illustrating example operations for characterizing optical zone diameter of ophthalmic devices in accordance with the present invention.

Referring now to FIG. 2, a flowchart illustrating example operations for characterizing optical zone diameter of ophthalmic devices is shown. This disclosure contemplates that the operations of FIG. 2 can optionally be performed by the system shown FIG. 1. At step 202, an image of an ophthalmic device is received, for example, by a computing device (e.g., computing device 106 of FIG. 1). As described herein, the ophthalmic device is illuminated by a light source (e.g., light source 102 of FIG. 1), and the image is captured by a Shack-Hartmann wavefront sensor (e.g., wavefront sensor 104 of FIG. 1). In particular, as the light source illuminates the ophthalmic device with a light beam, the wavefront is focused by an array of lenses (e.g., array of lenslets 105 of FIG. 1) into a photon sensor (e.g., photon sensor 107 of FIG. 1), which captures the image. The image is then transmitted to a computing device for further analysis. The image has a spot pattern, which includes a plurality of spots and a plurality of distorted spots. As described herein, the Shack-Hartmann wavefront sensor performs wavefront reconstruction to obtain a wavefront map, and wavefront distortion is present in the OZ boundary of the ophthalmic device such that one or more focal points are shifted along x- and/or y-direction. Such wavefront distortion is visible at the OZ boundary (see FIGS. 7-10) and can be used to characterize the OZ diameter of the ophthalmic device. For example, the shifted focal point(s) result in distorted spots, which are visible in the image of the ophthalmic device (see FIGS. 7-10). In some implementations, the distorted spots include at least two overlapping spots in the spot pattern. Alternatively or additionally, in some implementations, the distorted spots include a spot in the spot pattern that is split into two or more portions. In this case, the wavefront distortion is so strong that a single spot is split into multiple spots.

At step 204, the image is analyzed to detect an optical zone (OZ) boundary of the ophthalmic device. For example, the step of analyzing the image can include selecting two or more of the distorted spots in the spot pattern. In some implementations, the distorted spots in the spot pattern are selected manually by a user. For example, this disclosure contemplates that the user can select distorted spots in the image displayed on a display device using an input device (e.g., keyboard, mouse, touchpad, etc.). Alternatively or additionally, in some implementations, the distorted spots in the spot pattern are selected automatically. This disclosure contemplates that an image processing algorithm can be used to select distorted spots in the image. For example, distorted spots can be identified based on size, shape, brightness, or combinations thereof. In some implementations, the image processing algorithm improves signal-to-noise ratio. In some implementations, the image processing algorithm employs a circle fitting process, e.g., conducted by geometric circular fit (which is based on orthogonal least squares) or algebraic circular fit. Image processing algorithms are known in the art. For example, the MATLAB programming language from MathWorks of Natick, MA includes image processing tools. It should be understood that the imaging processing algorithm described above is provided only as an example. This disclosure contemplates using other image processing algorithms known in the art to select distorted spots.

The number of selected distorted spots (i.e., those selected manually and/or automatically as described above) is greater than two, for example, between 3 and 50 distorted spots. Optionally, the number of selected distorted spots is a maximized and convenient number of points for curve fitting (described below). For example, when selecting distorted spots, the total number selected needs to be at least 3 distorted spots. It should be understood that more than 3 distorted spots can be selected, e.g., 4, 5, 6, . . . 50 or more distorted spots may be selected. It should also be understood that a greater number of points generally results in more precise curve fitting but, at some number of points, the relative improvement in precision is not justified by selecting more points. In other words, the computational expense resulting from additional points outweighs the slight gains in precision. Additionally, to achieve better circle fitting precision, the selected distorted spots need to be distributed around the curve, which is the OZ boundary (or distortion zone). For example, the selected points need to be distributed (with even or uneven spacing) in different sectors or regions of the curve. This is as opposed to selecting all or a number of points localized in one sector or region of the curve. Thereafter, the step of analyzing the image can include fitting a curve to the selected distorted spots. The curve is the OZ boundary of the ophthalmic device. Additionally, the selected distorted spots are distributed with even or uneven spacing around the curve. This disclosure contemplates that curve fitting can be accomplished using a fitting algorithm such as a least squares circle or ellipse fitting algorithm. Curve fitting algorithms are known in the art. For example, the MATLAB programming language from MathWorks of Natick, MA includes curve fitting tools. It should be understood that the at least squares circle or ellipse fitting algorithm described above is provided only as an example. This disclosure contemplates using other curve fitting algorithms known in the art.

At step 206, a diameter of the OZ boundary of the ophthalmic device is measured. An image analysis algorithm can be employed to measure the diameter of the OZ boundary of the ophthalmic device. Image analysis algorithms are known in the art. For example, the MATLAB programming language from MathWorks of Natick, MA includes image analysis tools.

It should be appreciated that, in some embodiments, an image analysis algorithm may be implemented using artificial intelligence, including by way of machine-learning algorithms. For example, a machine learning model for identifying OZ diameter may be trained by providing the machine learning algorithm with training data in the form of images captured by a Shack-Hartmann wavefront sensor in which distorted spots have been identified by a user. Additionally, or alternatively, training images may include images in which the OZ diameter has been identified by a curve fitting algorithm, such as those described above, which fit a curve to user-selected or automatically identified distorted spots within the images.

Figure 3:
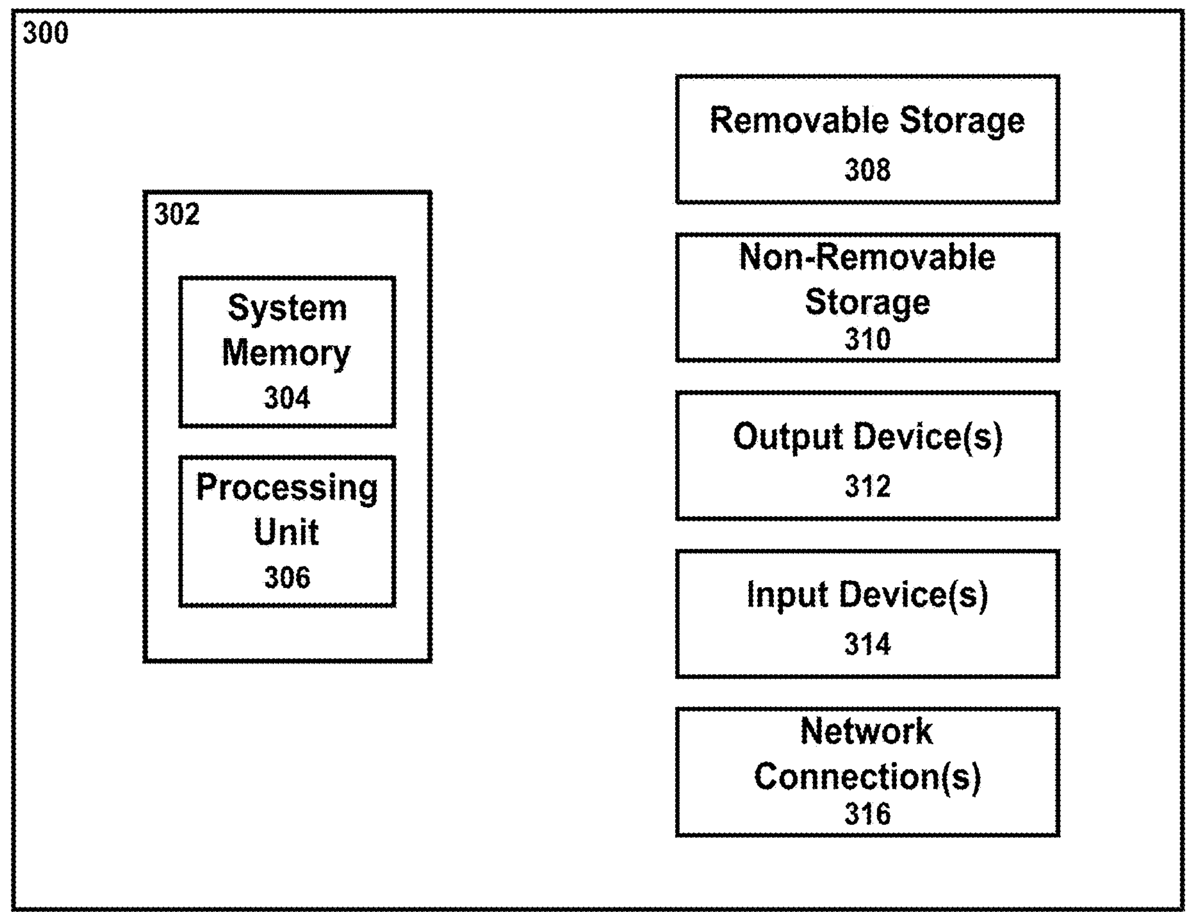
FIG. 3 is an example computing device.

Referring to FIG. 3, an example computing device 300 upon which the methods described herein may be implemented is illustrated. It should be understood that the example computing device 300 is only one example of a suitable computing environment upon which the methods described herein may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. The computing device 300 may also include a bus or other communication mechanism for communicating information among various components of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media and non-removable media implemented in any method or technology for storage of information such as computer readable instructions, data structures, program modules or other data. System memory 304, removable storage 308, and non-removable storage 310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Figure 4A:
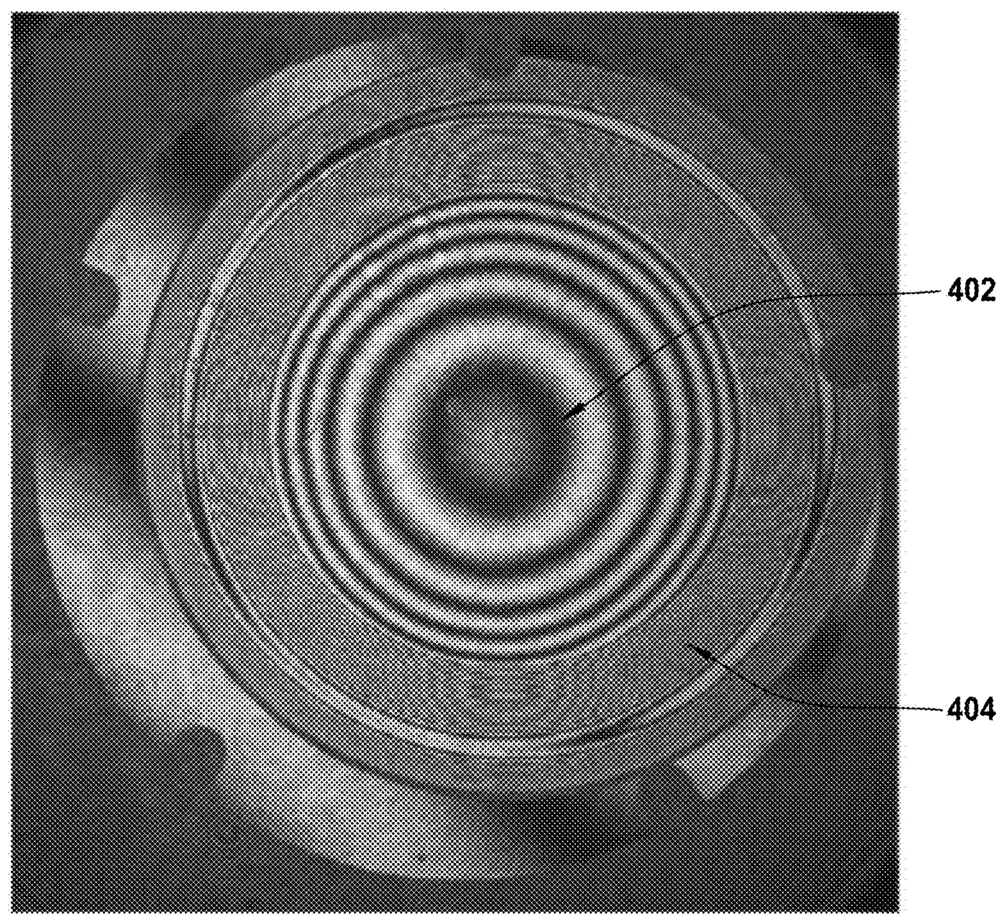
FIGS. 4A and 4B are images of a −1 diopter (D) soft contact lens captured using an interferometry-based system.
Figure 4B:
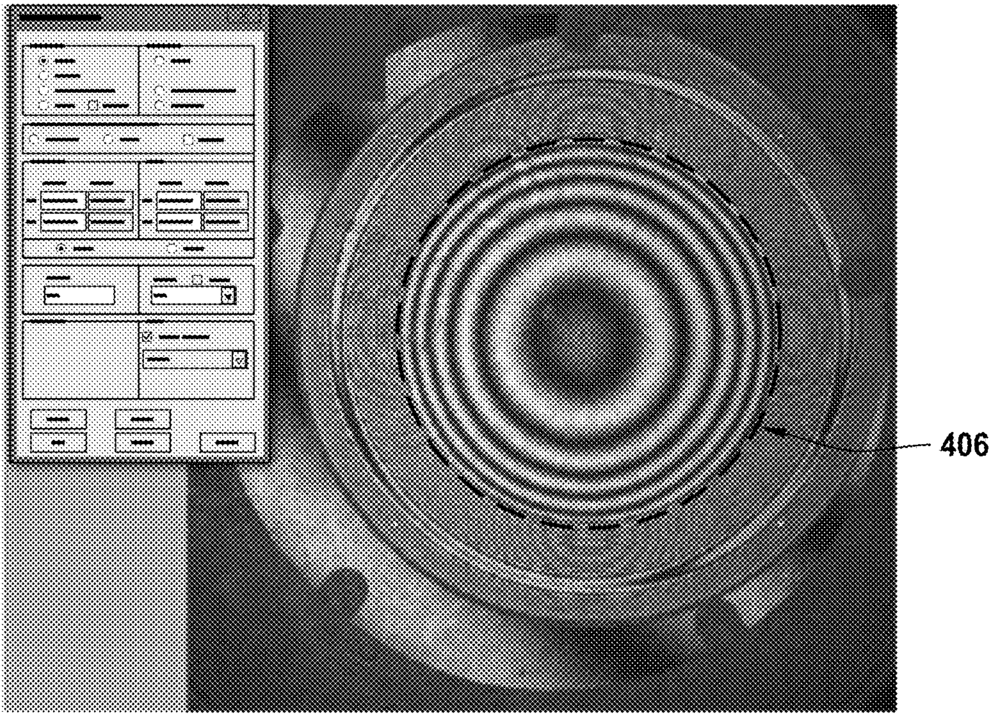

In the examples below, OZ diameter characterization using interferometry (conventional system and method) is compared to OZ diameter characterization using the systems and methods described herein (see FIGS. 1 and 2). The systems and methods described herein are capable of accurately characterizing OZ diameter of contact lenses. In addition, the systems and methods described herein are capable of accurately characterizing OZ diameter of low-power contact lenses, which is not possible using interferometry (conventional system and method). FIGS. 4A and 4B illustrate a typical OZ diameter measurement using an interferogram. In FIG. 4A, a −1 diopter OASYS ACUVUE soft contact lens from Johnson & Johnson of New Brunswick, New Jersey was measured with a system including an interferometer. The optical zone 402, which is located in a central region, shows a different interference pattern as compared to the interference pattern of the peripheral regions 404. To accurately measure the OZ diameter, a circle was drawn (as shown by dashed line 406 in FIG. 4B) and its diameter was calculated as the OZ diameter after considering the system image magnification calibration. However, precisely identifying the OZ boundary in the interferogram is not easy. This is especially difficult when measuring OZ diameter of lenses with lower powers (e.g., −4 D to 0 D lenses as described herein). For lenses with lower power, the OZ sag variation (across the lens diameter) is not significant as compared with OZ sag variation (across the lens diameter) of the lenses with higher powers. In other words, at the OZ boundary region, there is no sharp variation of the thickness (or sag) profiles in lower power lenses and thus there is no significant interference pattern variation which makes the overall OZ diameter precision measurement difficult for conventional system and methods. A 9.15 mm OZ diameter was obtained for the lens shown in FIGS. 4A and 4B through interferometer instrument measurement. The designed OZ diameter for the −1 D OASYS ACUVUE soft contact lens is 9.0 mm. The difference (i.e., 0.15 mm) may have been introduced by the interferometer measurement inaccuracy.

Figure 5:
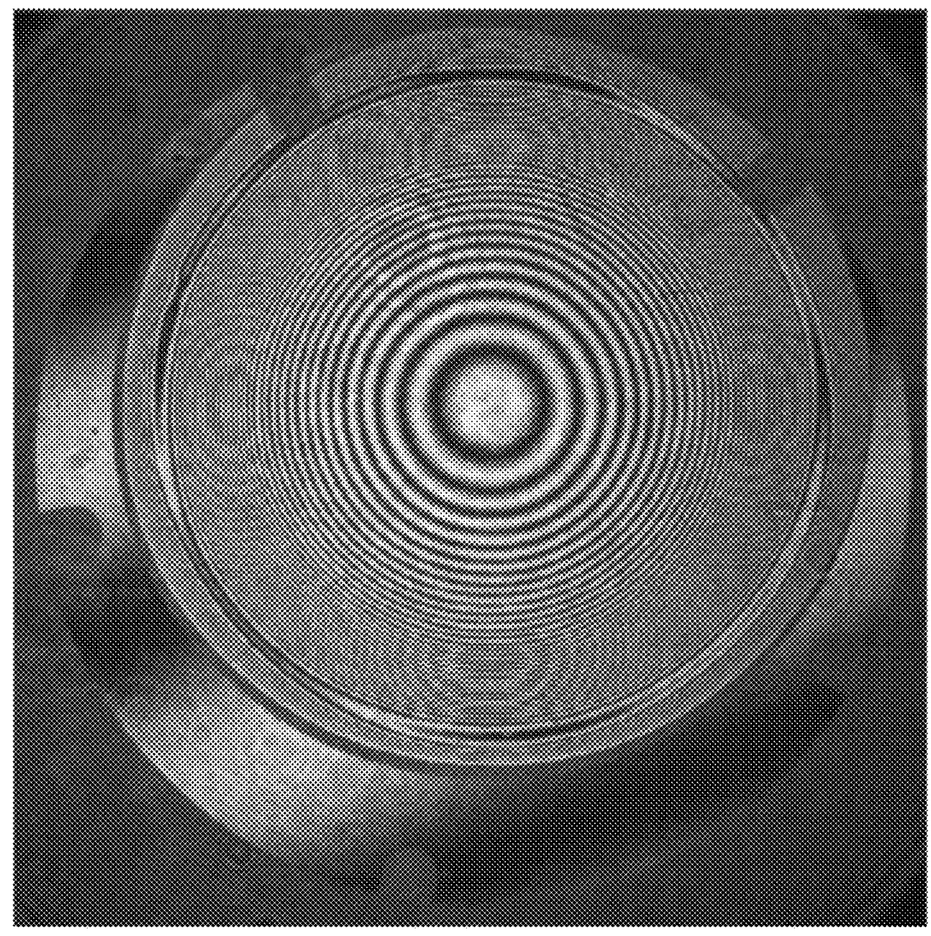
FIG. 5 is an image of a −3 D soft contact lens captured using an interferometry-based system. Unlike FIGS. 4A and 4B, it is very hard to distinguish the lens' OZ area from the peripheral region in FIG. 5 due to smooth interference pattern variation from the lens' center to its peripheral edge.

OZ boundary is even harder to observe in the interferogram for low power contact lenses (e.g., those with powers of about −3 D). FIG. 5 shows the measured interference pattern of a −3 D soft contact lens in an interferogram. As shown in FIG. 5, there is no clear boundary between the OZ and peripheral region, which is due to the smooth interference pattern variation from the lens' OZ to its peripheral region. In contrast, as described below, system and methods including a wavefront sensor can be used to precisely characterize soft contact lens OZ diameter, including lenses with lower powers.

Figure 6:
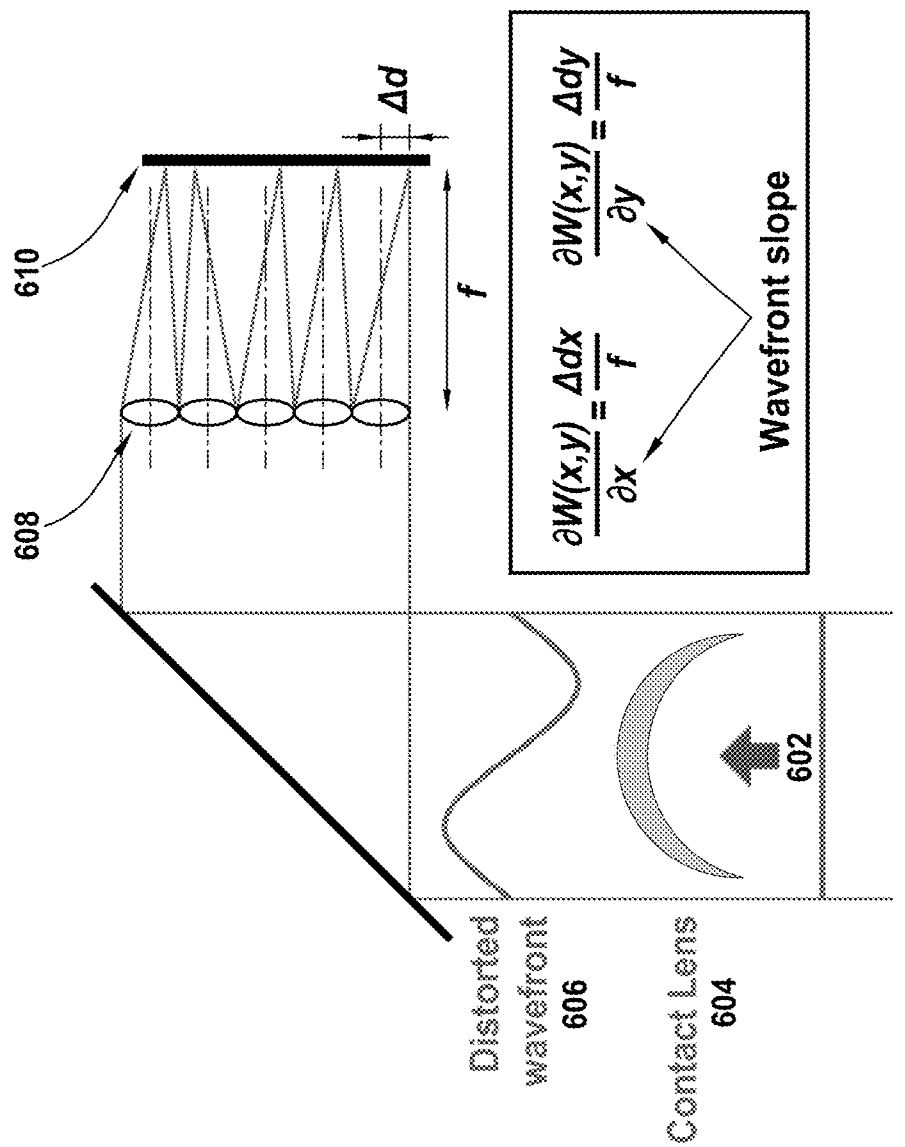
FIG. 6 is a schematic diagram of an example experimental setup of a transmission Shack-Hartmann (SH) wavefront sensor according to an implementation described herein.

FIG. 6 shows the schematic diagram of an example experimental setup of a transmission Shack-Hartmann (SH) wavefront sensor. A collimated light beam 602 passes through a soft contact lens 604, which is immersed in lens solution, and a distorted wavefront 606 is generated. The distorted wavefront 606 is focused by a lenslet array 608 into an array of focal points (or spots), and its image is captured by a CCD camera 610. Comparing with plane wave, the focal point position of distorted wavefront 606 is shifted (along x- and/or y-direction) and the shifting distance can be measured with CCD camera 610. By using the shifting distance divided by lenslet focal length, the local wavefront slope at each individual lenslet location is calculated, and the overall wavefront map can be obtained by wavefront reconstruction. At the OZ boundary of the contact lens, wavefront distortion is generated and focal spots are shifted significantly resulting in a clear boundary in the detected SH image.

Figure 7:
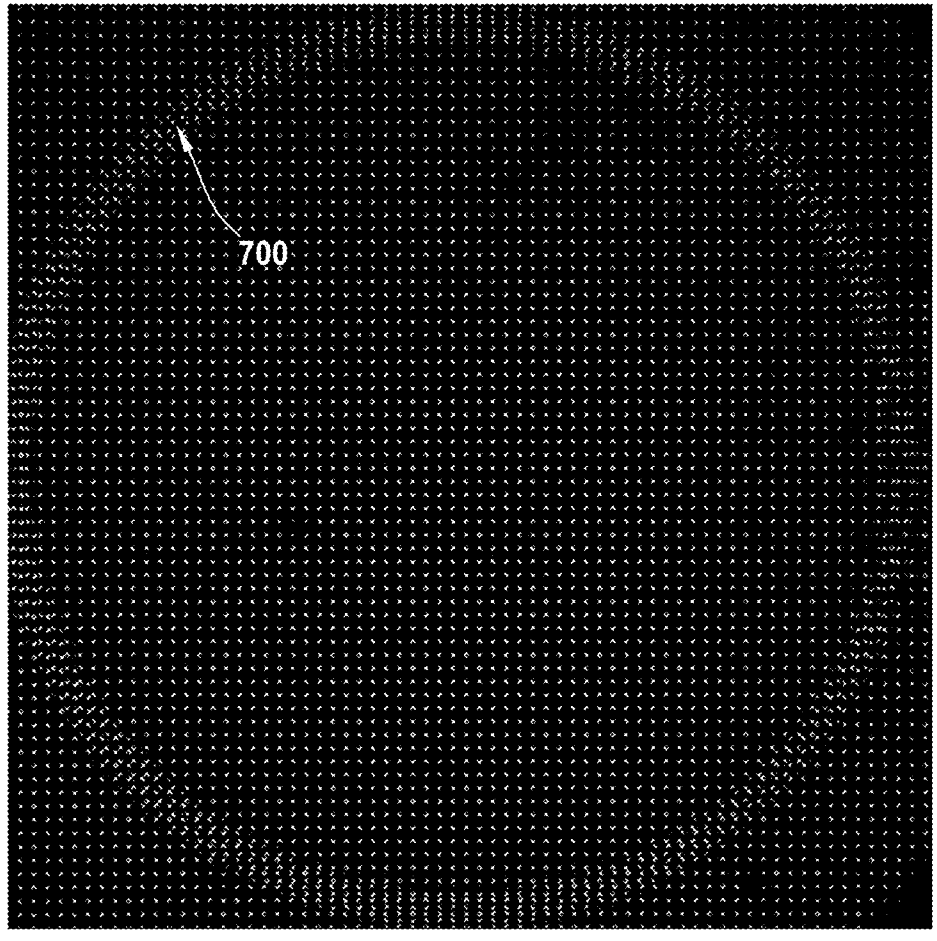
FIG. 7 is an image of a −8 D soft contact lens captured using a system including a SH wavefront sensor.

FIG. 7 shows a −8 D soft contact lens that was imaged with a system including a SH wavefront sensor (e.g., as shown in FIG. 6). The SH image has a spot pattern that includes a plurality of spots and a plurality of distorted spots. For example, at the OZ boundary region 700, the distance between the nearest two SH spots is significantly different than the distance between the nearest two SH spots in other regions. The spots in the OZ boundary region 700 are the "distorted spots." Thus, an OZ boundary is observed distinctively in the SH image of FIG. 7.

Figures 8A, 8B:
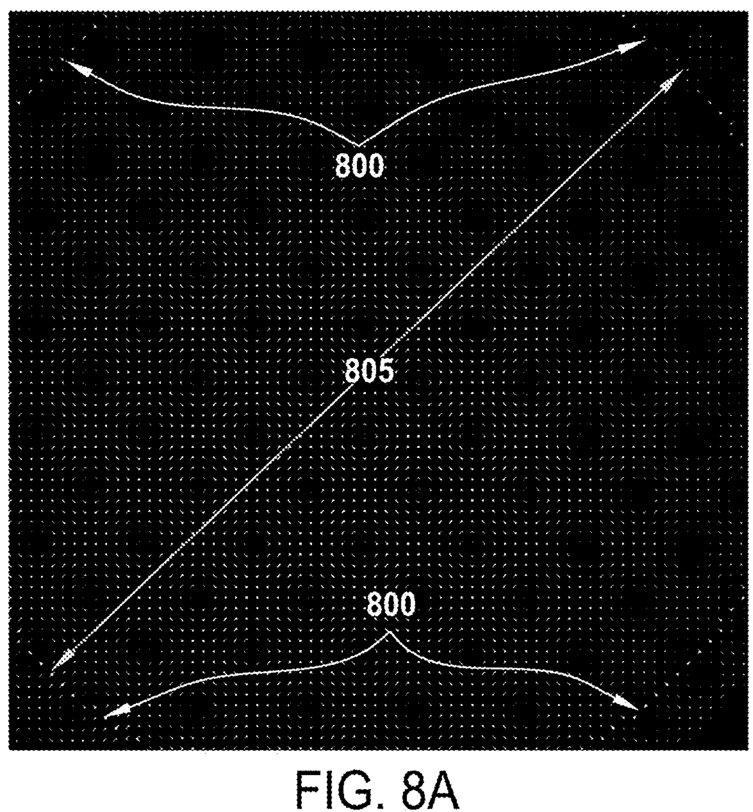
FIGS. 8A and 8B are images of a −1 D soft contact lens captured using a system including a SH wavefront sensor.

FIGS. 8A and 8B show a −1 D soft contact lens that was imaged with a system including a SH wavefront sensor (e.g., as shown in FIG. 6). This is a low-power soft contact lens. The SH image has a spot pattern that includes a plurality of spots and a plurality of distorted spots. For example, a plurality of distorted spots are present at the OZ boundary region 800. Thus, a sharp and clear boundary is observed in the images of FIGS. 8A and 8B. As shown in FIG. 8A, the imaged lens OZ diameter is slightly larger than CCD sensor size and the OZ boundary region 800 is only shown at the corners of the image. This can be compensated for by using an optical imaging system with higher de-magnification coefficient. In FIG. 8B, the −1 D soft contact lens is intentionally decentered such that the bottom part of the lens edge was entirely imagined within CCD sensor. The lens' overall circular OZ shape can be recognized based on the distorted spots, and the measured OZ diameter (as shown in arrow 805 in FIG. 8A) was 9.03 mm. For the lens measured in FIGS. 8A and 8B, the designed value is 9 mm (i.e., the difference between measurement and design is 0.03 mm). For comparison, the OZ diameter of a soft contact lens was manually measured using an interferometry-based method (see FIGS. 4A-4B) and precision (i.e., the difference between measurement and design) was estimated to be about 0.2 mm. Thus, interferometry-based OZ diameter measurements are less precise than OZ diameter measurements obtain using SH-wavefront sensor-based systems and methods. It should also be understood that there currently is no standard automated technique (e.g., algorithm) to measure OZ diameter using interferometry. As discussed above, OZ measurements were manually performed using the interferograms shown in FIGS. 4A and 4B.

Figure 9:
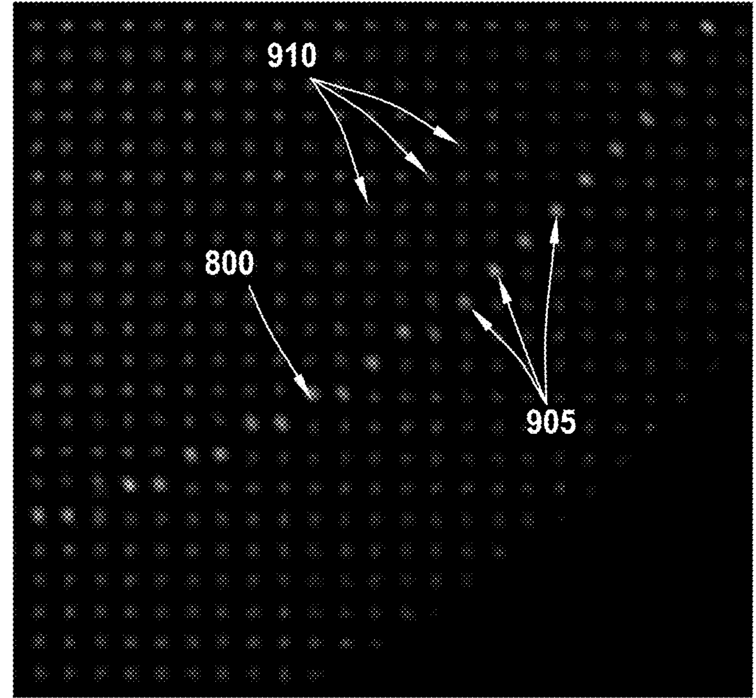
FIG. 9 is a magnified image of a portion of the 1 D soft contact lens shown in FIGS. 8A and 8B. By magnifying the SH spot pattern, at OZ boundary edge, elliptical and brighter spots were observed. The distortion may be caused by the nearest spots overlapping with each other.

FIG. 9 shows a portion of the OZ boundary region 800 of the −1 D soft contact lens imaged as shown in FIGS. 8A and 8B. By zooming into the OZ boundary region 800, as shown in FIG. 9, distorted spots (e.g., clearly brighter and more elliptical) are observed. As described herein, the distorted spots can be identified by size, shape, brightness, etc. Three distorted spots 905 are labeled in FIG. 9 as examples. The distorted spots in the OZ boundary region 800 are the result of the SH spots partially overlapping (only in boundary region) due to large amount of wavefront distortion in the OZ boundary. Thus, the distorted spots are visibly distinct from the spots (e.g., normal, undistorted) in other regions of the contact lens. Three normal spots 910 are labeled in FIG. 9 as examples. The distorted spots can be used to measure the OZ diameter of the contact lens as described herein.

Figure 10:
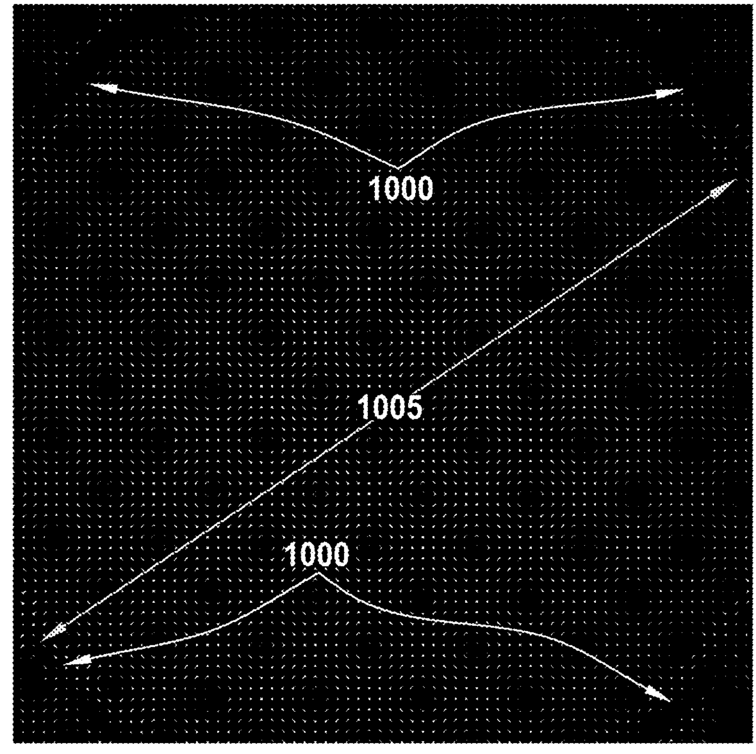
FIG. 10 is an image of −3 D lens (with 1.25 D cylindrical power) captured using a system including a SH wavefront sensor.

FIG. 10 shows a −3 D lens (with 1.25 D cylindrical power) that was imaged with a system including a SH wavefront sensor (e.g., as shown in FIG. 6). A clear OZ boundary 1000 from both the lens' front and back surfaces is observed in the SH image. Additionally, the overall OZ diameter was measured as 8.79 mm (see e.g., arrow 1005 shown in FIG. 10).

The measurements obtained from the images shown in FIGS. 7-10 demonstrate that a soft contact lens's optical zone (OZ) boundary can be precisely identified by employing a system including a SH wavefront sensor, and thus, the soft contact lens' OZ diameter can be measured accurately.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A system, comprising:

a light source;

a Shack-Hartmann wavefront sensor; and a computing device operably coupled to the wavefront sensor, the computing device comprising a processor and a memory operably coupled to the processor, the memory having computer-executable instructions stored thereon that, when executed by the processor, cause the processor to:

receive an image of an ophthalmic lens having an optical zone (OZ), and a peripheral zone positioned radially outward of the OZ, and an OZ boundary positioned between the OZ and the peripheral zone, and a peripheral edge of the ophthalmic lens positioned radially outward of the peripheral zone, the image being produced by light from the light source passing through the OZ, the OZ boundary, and through the peripheral zone, the image being captured by the wavefront sensor, analyze the image to detect the OZ boundary of the ophthalmic lens, and measure a diameter of the OZ boundary of the ophthalmic lens.

2. The system of claim 1, wherein the Shack-Hartmann wavefront sensor comprises an array of lenslets and a photon sensor.

3. The system of claim 2, wherein the photon sensor is a charged-coupled device (CCD) array or a complimentary metal-oxide-semiconductor (CMOS) array.

4. The system of claim 1, wherein the light source is a collimated light source or a point source.

5. The system of claim 1, wherein the image comprises a spot pattern, the spot pattern comprising a plurality of spots and a plurality of distorted spots.

6. The system of claim 5, wherein respective focal points of the distorted spots are shifted in at least one direction.

7. The system of claim 5, wherein the distorted spots include at least two overlapping spots in the spot pattern.

8. The system of claim 5, wherein the distorted spots include a spot in the spot pattern that is split into two or more portions.

9. The system of claim 5, wherein analyzing the image to detect the OZ boundary of the ophthalmic lens comprises:

selecting two or more of the distorted spots in the spot pattern; and fitting a curve to the selected distorted spots, wherein the curve is the OZ boundary of the ophthalmic lens.

10. The system of claim 9, wherein selecting the distorted spots in the spot pattern comprises selecting between 3 and 50 distorted spots.

11. The system of claim 9, wherein the selected distorted spots are distributed around the curve.

12. The system of claim 11, wherein the selected distorted spots are distributed with even or uneven spacing around the curve.

13. The system of claim 9, wherein selecting two or more of the distorted spots in the spot pattern comprises receiving user-selected distorted spots.

14. The system of claim 9, wherein selecting two or more of the distorted spots in the spot pattern comprises selecting the two or more of the distorted spots using an image processing algorithm.

15. The system of claim 1, wherein the ophthalmic lens is a contact lens.

16. The system of claim 15, wherein the contact lens is a low-power contact lens.

17. The system of claim 15, wherein a power of the contact lens is between about −12 diopters (D) and about +9 D.

18. A method, comprising:

receiving, at a computing device, an image of an ophthalmic lens captured by a Shack-Hartmann wavefront sensor, the ophthalmic lens having an optical zone (OZ), and a peripheral zone positioned radially outward of the OZ, and an OZ boundary positioned between the OZ and the peripheral zone, and a peripheral edge of the ophthalmic lens positioned radially outward of the peripheral zone, the image being produced by light from a light source passing through the OZ, the OZ boundary, and through the peripheral zone;

analyzing, using the computing device, the image to detect the OZ boundary of the ophthalmic lens; and measuring, using the computing device, a diameter of the OZ boundary of the ophthalmic lens.

19. The method of claim 18, further comprising capturing the image of the ophthalmic lens using the wavefront sensor.

20. The method of claim 18, wherein the ophthalmic lens is a contact lens.

21. The method of claim 20, further comprising providing the contact lens.

22. The method of claim 21, further comprising immersing the contact lens in a solution before capturing the image.

23. The method of claim 20, wherein the contact lens is a low-power contact lens.

24. The method of claim 20, wherein a power of the contact lens is between about −12 diopters (D) and about +9 D.

25. The method of claim 18, wherein the image comprises a spot pattern, the spot pattern comprising a plurality of spots and a plurality of distorted spots.

26. The method of claim 25, wherein respective focal points of the distorted spots are shifted in at least one direction.

27. The method of claim 25, wherein the distorted spots are at least two overlapping spots in the spot pattern.

28. The method of claim 25, wherein analyzing, using the computing device, the image to detect the OZ boundary of the ophthalmic lens comprises:

selecting two or more of the distorted spots in the spot pattern; and fitting a curve to the selected distorted spots, wherein the curve is the OZ boundary of the ophthalmic lens.

29. The method of claim 28, wherein selecting the distorted spots in the spot pattern comprises selecting between 3 and 50 distorted spots.

30. The method of claim 28, wherein the selected distorted spots are distributed around the curve.

31. The method of claim 30, wherein the selected distorted spots are distributed with even or uneven spacing around the curve.

32. The method of claim 28, wherein selecting two or more of the distorted spots in the spot pattern comprises receiving user-selected distorted spots.

33. The method of claim 28, wherein selecting two or more of the distorted spots in the spot pattern comprises selecting the two or more of the distorted spots using an image processing algorithm.

* * * * *